United States Patent
Takeuchi (10) Patent No.: US 9,392,141 B2
(45) Date of Patent: Jul. 12, 2016

(54) IMAGE DISPLAY APPARATUS, IMAGE PROCESSING APPARATUS, AND NON-TRANSITORY COMPUTER-READABLE MEDIUM

(71) Applicant: FUJI XEROX CO., LTD., Minato-ku, Tokyo (JP)

(72) Inventor: Yuri Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/466,411

(22) Filed: Aug. 22, 2014

(65) Prior Publication Data
US 2015/0281521 A1 Oct. 1, 2015

(30) Foreign Application Priority Data
Mar. 26, 2014 (JP) ................. 2014-063719

(51) Int. Cl.
*G03G 15/00* (2006.01)
*H04N 1/44* (2006.01)
*G06K 15/00* (2006.01)
*H04N 1/00* (2006.01)

(52) U.S. Cl.
CPC ........... *H04N 1/442* (2013.01); *G03G 15/5016* (2013.01); *G06K 15/4095* (2013.01); *H04N 1/00413* (2013.01); *H04N 1/4433* (2013.01); *H04N 2201/0091* (2013.01); *H04N 2201/0094* (2013.01)

(58) Field of Classification Search
CPC ........................... H04N 1/442; G03G 15/5016
USPC .......................................................... 399/81
See application file for complete search history.

(56) References Cited

U.S. PATENT DOCUMENTS

| 8,730,007 | B2* | 5/2014 | Otake | G06F 21/608 340/5.82 |
| 2006/0066891 | A1* | 3/2006 | Ikeda | G06F 3/1222 358/1.15 |
| 2006/0092455 | A1* | 5/2006 | Maeda | H04N 1/00204 358/1.15 |
| 2008/0085132 | A1* | 4/2008 | Asada | G03G 15/5016 399/83 |
| 2010/0231390 | A1* | 9/2010 | Hashimoto | G03G 15/5004 340/573.1 |
| 2013/0106674 | A1* | 5/2013 | Wheeler | G02B 27/017 345/8 |
| 2014/0237366 | A1* | 8/2014 | Poulos | G06F 3/013 715/728 |
| 2015/0220157 | A1* | 8/2015 | Marggraff | G06F 3/01 345/156 |
| 2015/0229808 | A1* | 8/2015 | Matsumura | H04N 1/442 358/1.13 |

FOREIGN PATENT DOCUMENTS

JP 2006-133847 A 5/2006

* cited by examiner

*Primary Examiner* — David Gray
*Assistant Examiner* — Tyler Hardman
(74) *Attorney, Agent, or Firm* — Sughrue Mion, PLLC (57) ABSTRACT

An image display apparatus and an image processing apparatus include an imaging unit, a display unit, a detection unit, a measurement unit, and a notification unit. The imaging unit images an operator. The imaging unit performs imaging on an operator. The display unit displays operation information for performing image processing. The detection unit detects viewing of the display unit by the operator on a basis of a result of the imaging performed by the imaging unit. The measurement unit accumulatively measures a time in which the detection unit detects the viewing. The notification unit provides a notification of guidance according to the image processing when the accumulatively measured time exceeds a predetermined threshold.

11 Claims, 6 Drawing Sheets

| USER ID | PROCESS TYPE | ACCUMULATED TIME |
|---------|--------------|------------------|
| 001 | COPY | 60 secs |
| | SCAN | 70 secs |
| | DOUBLE-SIDED COPY | 80 secs |
| | ⋮ | ⋮ |
| 002 | SCAN | 40 secs |
| | DOUBLE-SIDED COPY | 50 secs |
| | ⋮ | ⋮ |

IMAGE DISPLAY APPARATUS, IMAGE PROCESSING APPARATUS, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2014-063719 filed Mar. 26, 2014.

BACKGROUND

Technical Field

The present invention relates to an image display apparatus, an image processing apparatus, and a non-transitory computer-readable medium.

SUMMARY

According to an aspect of the present invention, there is provided an image display apparatus including an imaging unit, a display unit, a detection unit, a measurement unit, and a notification unit. The imaging unit performs imaging on an operator. The display unit displays operation information for performing image processing. The detection unit detects viewing of the display unit by the operator on a basis of a result of the imaging performed by the imaging unit. The measurement unit accumulatively measures a time in which the detection unit detects the viewing. The notification unit provides a notification of guidance according to the image processing when the accumulatively measured time exceeds a predetermined threshold.

According to another aspect of the present invention, there is provided an image processing apparatus including an imaging unit, a display unit, a detection unit, a measurement unit, and a notification unit. The imaging unit performs imaging on an operator. The display unit displays operation information for performing image processing. The detection unit detects viewing of the display unit by the operator on a basis of a result of the imaging performed by the imaging unit. The measurement unit accumulatively measures a time in which the detection unit detects the viewing. The notification unit provides a notification of guidance according to the image processing when the accumulatively measured time exceeds a predetermined threshold.

BRIEF DESCRIPTION OF THE DRAWINGS

Exemplary embodiments of the present invention will be described in detail based on the following figures, wherein.

DETAILED DESCRIPTION

1. Configuration

Figure 1:
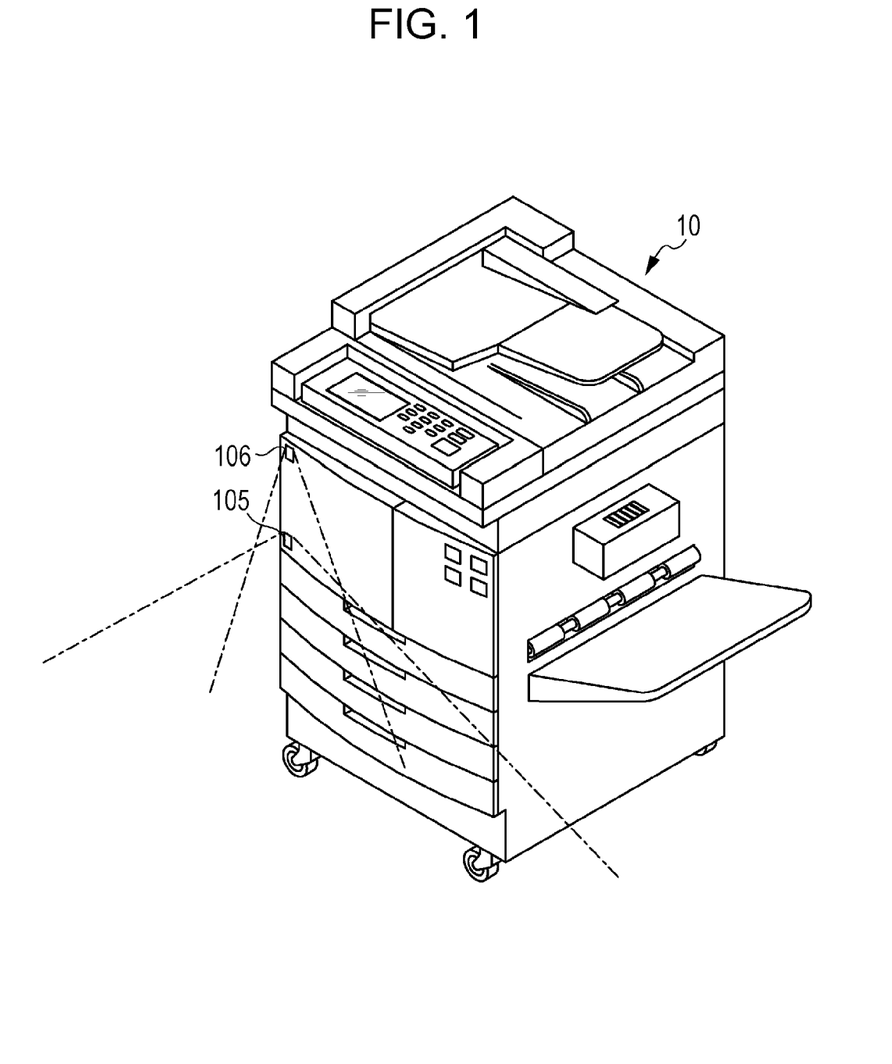
FIG. 1 is an external view of an image forming apparatus.

FIG. 1 is a perspective view of the appearance of an image forming apparatus 10 according to an exemplary embodiment of the present invention. The image forming apparatus 10 is an exemplary image processing apparatus or an image display apparatus according to the exemplary embodiment of the present invention. The image forming apparatus 10 is, for example, an electrophotographic image forming apparatus. The image forming apparatus 10 has an image forming function of forming an image on a recoding medium such as a sheet of paper, a copying function of copying an image, a scan function of reading out an image formed on a recording medium, and the like. The functions of the image forming apparatus 10 are not limited to these. For example, the image forming apparatus 10 may have a facsimile function. In addition, the image forming apparatus 10 is not limited to one having all of the above-described functions. For example, the image forming apparatus 10 may have an image forming function and a copying function, but not the other functions.

The image forming apparatus 10 includes a pyroelectric sensor 105 and a camera 106. The sensor 105 is a sensor which consumes power lower than that of the camera 106 and which detects a motion of a user in a detection area broader than that of the camera 106. The camera 106 photographs a user who is present in front of the image forming apparatus 10, and outputs photographic data presented as a movie or a still image obtained through the photographing. The photographic data is used to perform user authentication. For example, an operator presses a power saving button, whereby the image forming apparatus 10 enters the sleep mode. In this state, when the pyroelectric sensor 105 detects a user, the image forming apparatus 10 releases the sleep mode, activates the camera 106, and performs authentication of the user. In this example, user authentication is performed by analyzing photographic data obtained through photographing using the camera 106.

Figure 2:
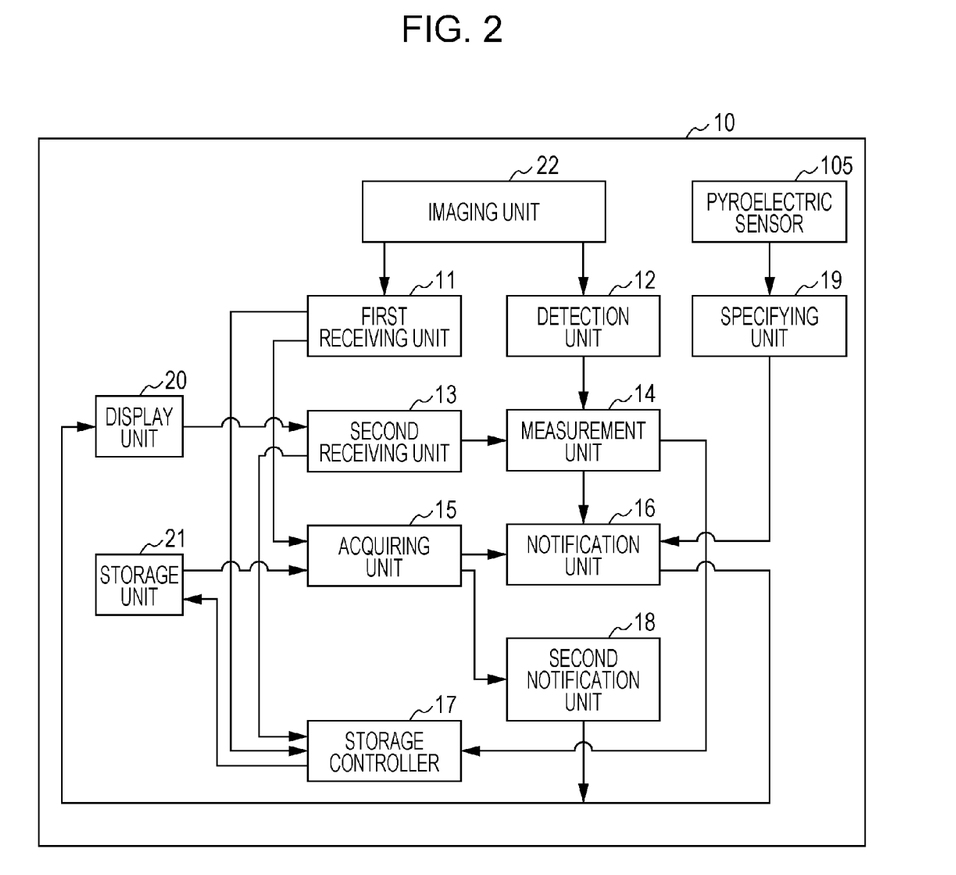
FIG. 2 is a diagram illustrating the functional configuration of the image forming apparatus.

FIG. 2 is a diagram illustrating the functional configuration of the image forming apparatus 10. The image forming apparatus 10 includes an imaging unit 22, a display unit 20, a detection unit 12, a measurement unit 14, a notification unit 16, a first receiving unit 11, a second receiving unit 13, an acquiring unit 15, a storage controller 17, a second notification unit 18, and a specifying unit 19. The imaging unit 22 performs imaging on an operator. The display unit 20 displays operation information for supplying the image forming apparatus 10 with an instruction to perform one of image processing operations. The detection unit 12 detects viewing of the display unit 20 which is performed by an operator, on the basis of the result of the imaging using the imaging unit 22. The measurement unit 14 accumulatively measures a time in which the detection unit 12 detects the viewing, for the image processing operation. The notification unit 16 provides a notification of guidance for the multiple image processing operations when the accumulatively measured time exceeds a predetermined threshold.

The first receiving unit 11 receives input of identification information for identifying an operator. In this example, the first receiving unit 11 analyzes photographic data which is output from the imaging unit 22, and obtains data for authentication which is extracted from the photographic data, as identification information. The second receiving unit 13 receives input of an instruction to perform an image processing operation, from an operator. In this example, examples of the "image processing operation" performed by the image forming apparatus 10 include various types of processing using image data, such as "copying" and "scanning".

The acquiring unit 15 acquires information corresponding to the identification information received by the first receiving unit 11, from a storage unit 21 which stores identification information for identifying an operator and information describing an image processing operation in such a manner that the identification information is associated with the information. When the accumulatively measured time obtained by the measurement unit 14 exceeds the predetermined threshold, the storage controller 17 stores information describing an image processing operation corresponding to an instruction received by the second receiving unit 13, in the storage unit 21 in such a manner that the information is associated with the identification information received by the first receiving unit 11.

When the acquiring unit 15 acquires the information from the storage unit 21, the second notification unit 18 provides a notification of guidance according to the information obtained by the acquiring unit 15, in at least part of the period from a predetermined start timing to a time when the second receiving unit 13 receives input of an instruction to perform an image processing operation. The specifying unit 19 specifies whether or not an operator is present in a predetermined area with respect to the image forming apparatus 10. In this example, the specifying unit 19 specifies whether or not an operator is present in a predetermined area with respect to the image forming apparatus 10, on the basis of a signal which is output from the pyroelectric sensor 105.

Figure 3:
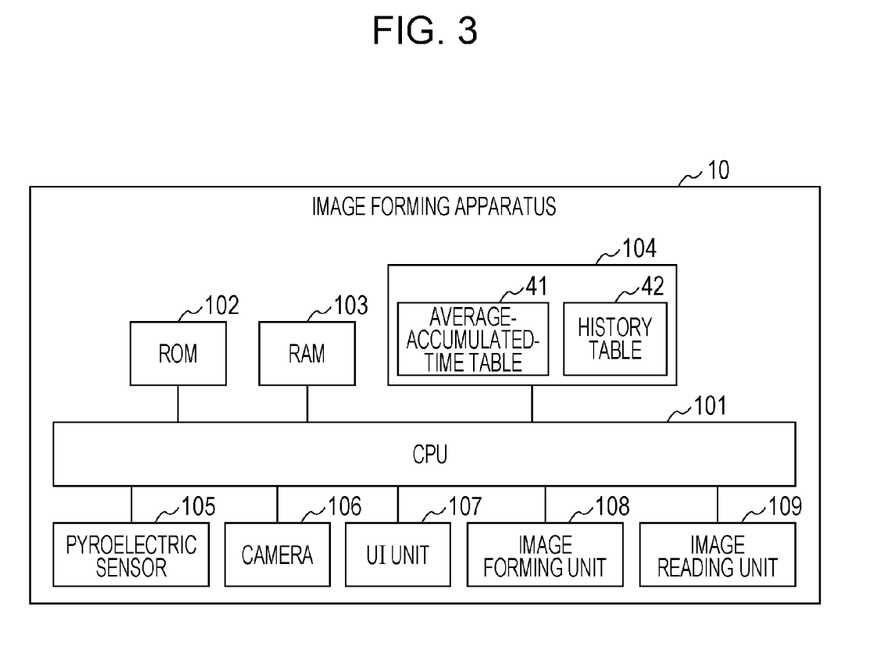
FIG. 3 is a diagram illustrating the hardware configuration of the image forming apparatus.

FIG. 3 is a diagram illustrating the hardware configuration of the image forming apparatus 10. The image forming apparatus 10 includes a central processing unit (CPU) 101, a read only memory (ROM) 102, a random access memory (RAM) 103, a storage 104, the pyroelectric sensor 105, the camera 106, a UI unit 107, an image forming unit 108, and an image reading unit 109. The CPU 101 is a controller (processor) which controls units of the image forming apparatus 10. The ROM 102 is a nonvolatile storage which stores programs and data. The RAM 103 is the main storage which is volatile and which functions as a work area when the CPU 101 executes programs. The storage 104 is an auxiliary storage which is nonvolatile and which stores programs and data. The pyroelectric sensor 105 is a sensor which detects a motion of a user (operator). The camera 106 photographs a user who is present in front of the image forming apparatus 10, and outputs photographic data presented as a movie or a still image obtained through the photographing.

The UI unit 107 has operators, such as various types of keys and a touch sensor, and supplies operation information according to an operation performed by a user, to the CPU 101. The CPU 101 performs processing according to the operation information. The UI unit 107 is provided with a liquid-crystal panel and a liquid-crystal drive circuit, and displays an image under control of the CPU 101. The image forming unit 108 forms an image on a recording medium such as a sheet of paper, by using an electrophotographic system. The image reading unit 109 optically reads out an image on a document.

In this example, the CPU 101 executes a guidance display program stored in the storage 104 (or the ROM 102), achieving the functions illustrated in FIG. 2. The CPU 101 executing the guidance display program serves as the first receiving unit 11, the detection unit 12, the second receiving unit 13, the measurement unit 14, the acquiring unit 15, the storage controller 17, and the specifying unit 19. The CPU 101 executing the guidance display program, or the CPU 101 and the UI unit 107 serve as the notification unit 16 and the second notification unit 18. The UI unit 107 serves as the display unit 20. The storage 104 serves as the storage unit 21. The camera 106 serves as the imaging unit 22.

2. Operations

Operations performed by the image forming apparatus 10 will be described. To operate the UI unit 107 of the image forming apparatus 10, a user approaches the image forming apparatus 10. The user is detected by the pyroelectric sensor 105. The detection of a user causes the camera 106 to be activated, and photographing is started. The camera 106 photographs the user and outputs photographic data.

Figure 4:
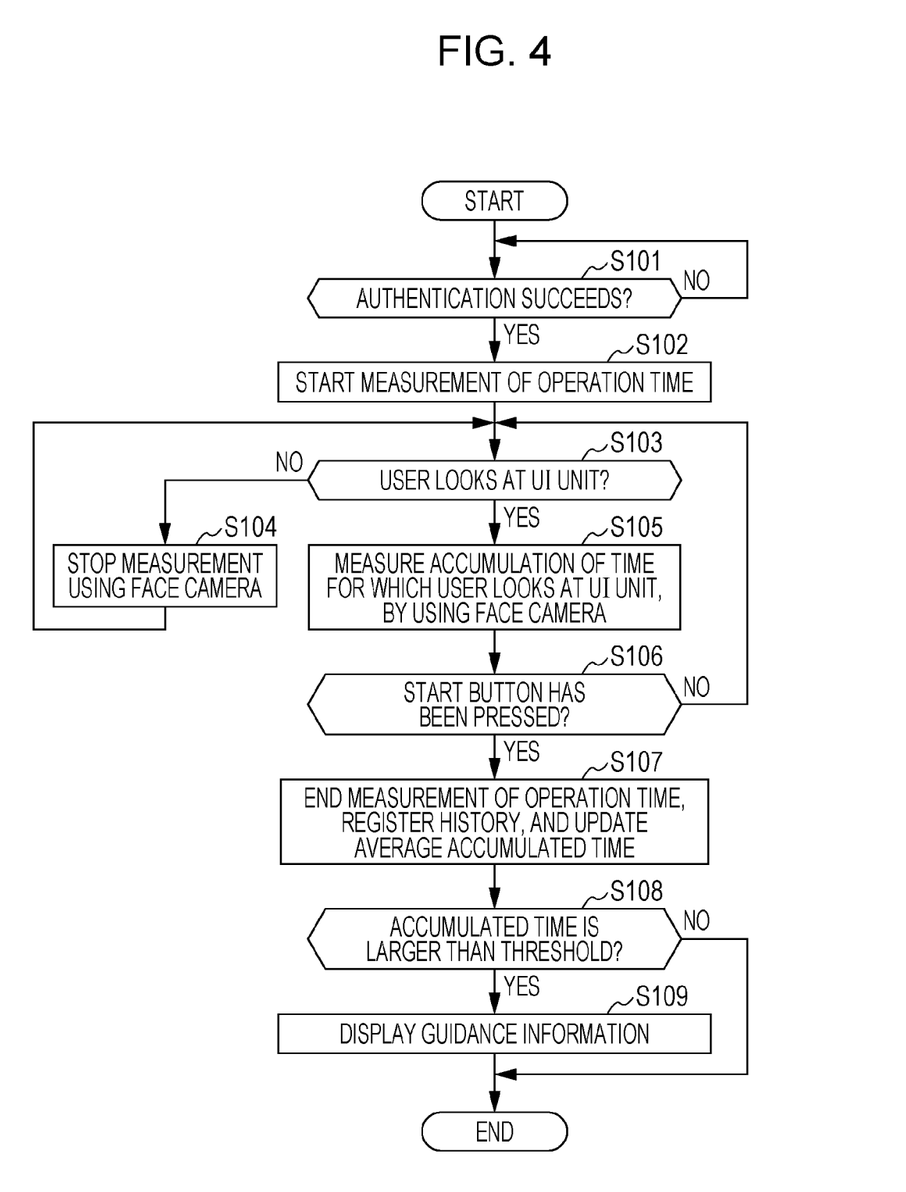
FIG. 4 is a flowchart of a guidance display process performed by the image forming apparatus.

FIG. 4 is a flowchart of a process performed by the CPU 101 of the image forming apparatus 10. In step S101, the CPU 101 analyzes the photographic data which is output from the camera 106, and checks the analysis result against predetermined authentication data, thereby performing user authentication. If the authentication succeeds, the CPU 101 proceeds to step S102. In step S102, the CPU 101 starts measurement of a time (hereinafter, referred to as an "operation time") from a time when the authentication succeeds to a time when the user presses a start button. If the user authentication fails in step S101, the CPU 101 performs the authentication process again until the user authentication succeeds. When the user authentication succeeds, the CPU 101 causes the UI unit 107 to display a screen for receiving input of an instruction to perform an image processing operation.

Figure 5:
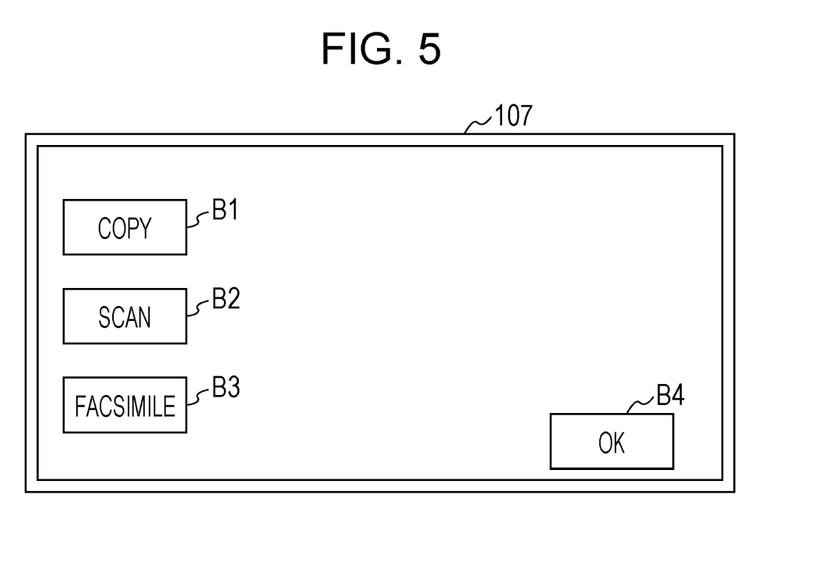
FIG. 5 is a diagram illustrating an exemplary screen displayed on a user interface (UI) unit.

FIG. 5 is a diagram illustrating an exemplary screen displayed on the UI unit 107 (hereinafter, referred to as a "UI screen"). In this example, a copy button B1, a scan button B2, a facsimile button B3, and an OK button B4 are displayed on the UI unit 107. The user uses the UI unit 107 to cause the image forming apparatus 10 to perform an image processing operation. For example, when copying is to be performed, the user presses the copy button B1 displayed on the UI unit 107. When the copy button B1 is pressed, a screen for performing various types of setting for the copy process is displayed on the UI unit 107. For example, a screen for setting "how to read (single-sided to single-sided, single-sided to double-sided, double-sided to double-sided, and the like)", and "magnification" is displayed on the UI unit 107. For example, the user selects one from process types, such as "single-sided to single-sided", "single-sided to double-sided", and "double-sided to double-sided". In addition, for example, when an enlarged copy or a reduced copy is to be obtained, the user sets a magnification. These setting processes may require a large amount of time if the user is not familiar with operations of the image forming apparatus 10. When the user completes various types of setting for the image processing operation, the user uses the UI unit 107 to provide an instruction to perform the image processing operation for which setting has been performed. In this example, the user presses the start button provided on the UI unit 107. When the start button is pressed, the UI unit 107 outputs information according to the operations performed by the user, and the CPU 101 starts execution of the image processing operation for which setting has been performed, on the basis of the information which is output from the UI unit 107.

In step S103 and its subsequent steps, the CPU 101 accumulatively measures a time (hereinafter, referred to as an "accumulated time") in which the user's line of sight is directed to the UI unit 107 in the period from a time when the user authentication succeeds to a time when the start button is pressed. In step S103, the CPU 101 detects the line of sight from a face image of the user by analyzing the photographic data, and determines whether or not the detected line of sight is directed to the UI unit 107, that is, whether or not the user looks at the UI unit 107 (views the UI unit 107). A known technique of detecting a line of sight is used to determine whether or not the user views the UI unit 107. If it is determined that the line of sight is not directed to the UI unit 107 (NO in step S103), the CPU 101 stops the accumulative measurement of time which is performed through analysis of photographic data from the camera 106 (face camera) in step S104, and the process returns back to the determination process in step S103 again. If it is determined that the line of sight is directed to the UI unit 107 (YES in step S103), the CPU 101 accumulatively measures a time (in step S105).

In step S106, the CPU 101 determines whether or not the start button has been pressed. If it is determined that the start button has been pressed (YES in step S106), the CPU 101 proceeds to step S107. If it is determined that the start button has not been pressed (NO in step S106), the CPU 101 returns back to step S103. In step S107, the CPU 101 ends measurement of the operation time, and registers the measurement result (the operation time and the accumulated time) as a history in the history table 42. In addition, the CPU 101 uses the measurement result to update the average accumulated time which is calculated for a corresponding one of the process types and which is stored in the average-accumulated-time table 41.

Figure 6:
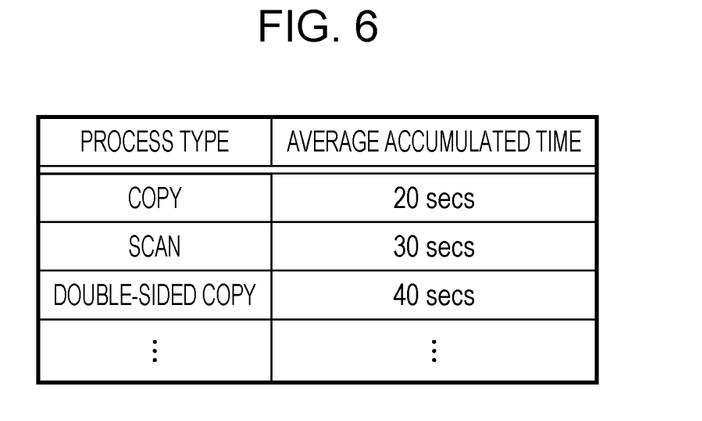
FIG. 6 is a diagram illustrating exemplary information in an average-accumulated-time table.

FIG. 6 is a diagram illustrating exemplary information in the average-accumulated-time table 41. As illustrated in FIG. 6, items "process type" and "average accumulated time" are stored in this table in such a manner that the items are associated with each other. Among these items, the item "process type" stores information representing an image processing type, such as "copy" or "scan". The item "average accumulated time" stores information representing the average accumulated time for each of the process types.

In step S108, the CPU 101 determines whether or not the accumulated time obtained through measurement is larger than a predetermined threshold. In this example, the average accumulated time for a corresponding one of the process types which is stored in the average-accumulated-time table 41 is used as the threshold. In this example, in step S108, the CPU 101 specifies the process type of the image processing operation on the basis of information which is output from the UI unit 107 on the basis of operations on the UI unit 107 which have been performed by the user, and specifies the average accumulated time corresponding to the specified process type as a threshold. If the accumulated time is equal to or less than the threshold (NO in step S108), the CPU 101 skips step S109, and ends the process. If the accumulated time is larger than the threshold, the CPU 101 proceeds to step S109, and displays guidance information. In step S109, the CPU 101 displays guidance information on the UI unit 107 on the basis of information stored in the history table 42 in the storage 104. The threshold used in the determination in step S108 is not limited to the average accumulated time corresponding to the process type. For example, a threshold may be set in advance for each of users, or a common threshold may be used for all of the process types.

Figure 7:
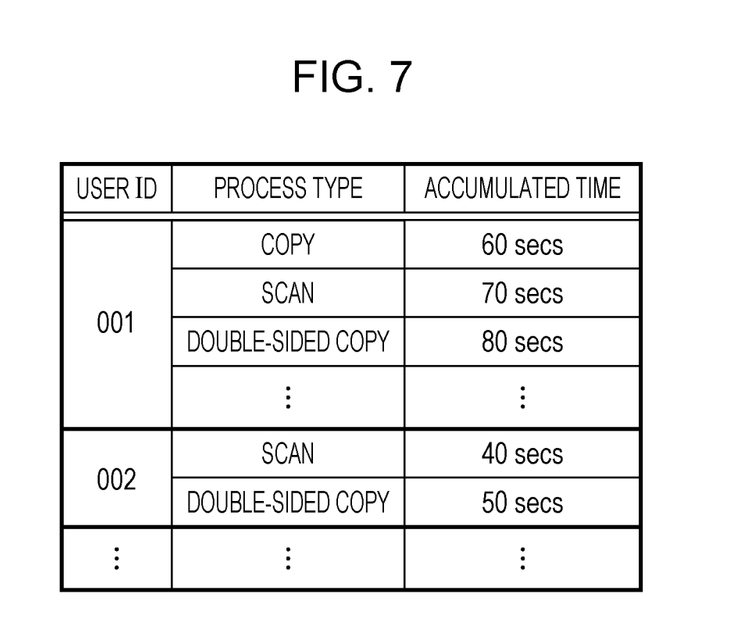
FIG. 7 is a diagram illustrating exemplary information in a history table.

FIG. 7 is a diagram illustrating exemplary information in the history table 42. In this table, information about a process which corresponds to an operation among operations that were performed by a user in the past and for which the accumulated time is larger than the predetermined threshold is accumulated as a history. As illustrated in FIG. 7, in the table, items "user ID", "process type", and "accumulated time" are stored in such a manner as to be associated with each other. Among these items, the item "user ID" stores identification information for identifying a user. The item "process type" stores information describing an image processing operation, such as "copy" or "scan". This information includes information representing the type of an image processing operation, such as "copy" or "scan", and various types of setting information used in the image processing operation (for example, a setting value of "how to read", and a setting value of "magnification"). The item "accumulated time" stores an accumulated time required when the user performed the operation of giving an instruction to perform the image processing operation.

In step S109, the CPU 101 displays guidance information on the UI unit 107 on the basis of information stored in the history table 42. In this example, the CPU 101 displays shortcut buttons for performing image processing operations for the process types registered as a history in the history table 42, on the UI unit 107 as guidance information. In a normal operation, a user presses one of the buttons displayed on the UI screen illustrated in FIG. 5 so as to select an image processing operation of which an instruction is to be provided, and determine detailed settings for the selected image processing operation. For example, a user presses the copy button B1 on the UI screen illustrated in FIG. 5. Then, the user determines settings, such as "how to read" and "magnification", one by one for the copy process. In contrast, a shortcut button is a button for providing an instruction to perform an image processing operation by using setting values which were set by the user in a past operation. That is, the user may just press a shortcut button to give an instruction to perform a desired image processing operation. It is not necessary to perform another operation for determining detailed settings (operation of setting "how to read", "magnification", and the like).

Figure 8:
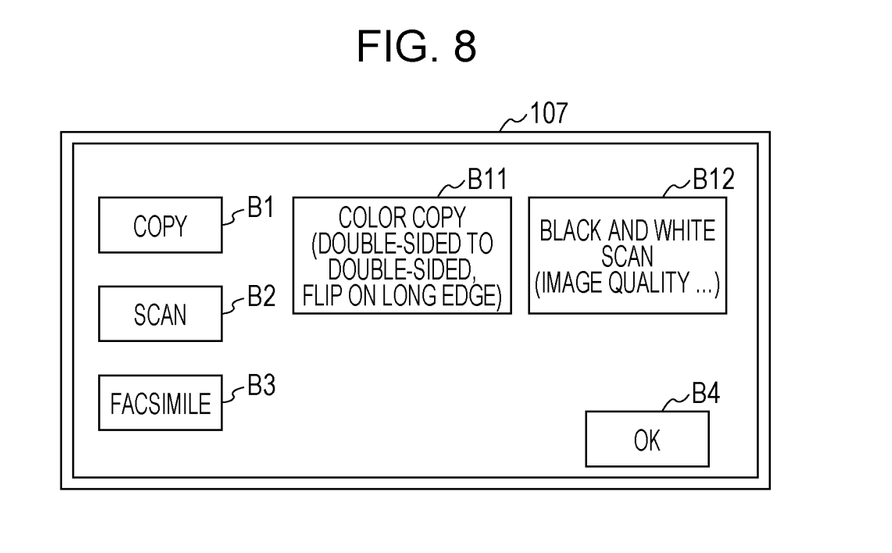
FIG. 8 is a diagram illustrating an exemplary screen displayed on the UI unit.

FIG. 8 is a diagram illustrating an exemplary UI screen on which shortcut buttons are displayed. As illustrated in FIG. 8, in addition to the operation buttons displayed on the UI screen illustrated in FIG. 5, shortcut buttons B11 and B12 for performing processes for the process types registered as a history in the history table 42 are displayed on the UI unit 107.

In step S109, if multiple process types are stored in the history table 42, the CPU 101 may display all of the shortcut buttons corresponding to the stored process types, on the UI unit 107. Alternatively, the CPU 101 may select one from the process types and display it on the UI unit 107. When one process type is to be selected, for example, the CPU 101 may select the process type for which the accumulated time is the largest, from the process types, or, for example, may select a process type for which the accumulated time is equal to or larger than the predetermined threshold.

In the present exemplary embodiment, when the accumulated time for a user exceeds the predetermined threshold, the shortcut buttons B11 and B12 according to the operation history of the user are displayed. The user may just press the shortcut button B11 or B12 to instruct the image forming apparatus 10 to perform a desired image processing operation, and does not need to perform other troublesome operations.

3. Modified Exemplary Embodiments

The above-described exemplary embodiment is an example of the present invention. The exemplary embodiment may be modified as described below. In addition, modified exemplary embodiments described below may be combined with each other.

3-1. First Modified Exemplary Embodiment

In the above-described exemplary embodiment, when an accumulated time in which the line of sight of a user is directed to the UI unit 107 is equal to or larger than the predetermined threshold, the CPU 101 displays guidance information. The timing at which guidance information is displayed may be, for example, a timing at which the image forming apparatus 10 authenticates the user again. In this case, the CPU 101 determines whether or not the history table 42 stores information corresponding to the user at a timing at which the user authentication succeeds. When corresponding information is stored, the CPU 101 displays guidance information according to the stored information. That is, when the history table 42 stores information corresponding to the user, the CPU 101 may display guidance information prior to start of measurement of an operation time. Another example is that, when an accumulated time has exceeded the predetermined threshold until a user presses the start button, the CPU 101 may display guidance information at a timing at which the accumulated time exceeds the threshold.

3-2. Second Modified Exemplary Embodiment

In the above-described exemplary embodiment, the CPU 101 employs a timing at which user authentication through photographing succeeds, as a timing of start of measurement of an accumulated time. The timing of start of measurement is not limited to this. For example, the CPU 101 may employ a timing at which the pyroelectric sensor 105 detects a user, as a timing of start of measurement. Another example is that, instead of the user authentication through photographing of a user, the user inputs the user ID and the password on the UI unit 107, whereby user authentication is performed. In this case, the CPU 101 may employ a timing at which user authentication using a user ID and a password succeeds, as a timing of start of measurement of an operation time.

Another example of a timing of start of measurement of an operation time is at least either one of a timing at which the CPU 101 successfully performs user authentication and a timing at which execution of an image processing operation caused by the immediately preceding instruction is completed. For example, when one user successively instructs the image forming apparatus 10 to perform multiple image processing operations, the CPU 101 may start measurement of an operation time of the next image processing operation at a timing at which execution of the image processing operation caused by the immediately preceding instruction is completed.

3-3. Third Modified Exemplary Embodiment

In the above-described exemplary embodiment, the CPU 101 causes the UI unit 107 to display shortcut buttons, thereby notifying a user of a guide (guidance information) of operations. The way of notification is not limited to this. For example, the CPU 101 may cause the UI unit 107 to display operational guidance information corresponding to information stored in the history table 42. The operational guidance information which is displayed may be, for example, a message and an image which specifically describe the procedure of the operation, and may include a message such as "Is the operation to be registered as a history?" In this case, when the user selects registration of the operation as a history, the CPU 101 may register the operation which has been performed, in the history table 42 on the basis of the selection. In addition, for example, the image forming apparatus 10 may have a speaker, and the CPU 101 may provide a notification by outputting a voice message of the operational guidance information from the speaker.

Another example is that the CPU 101 may transmit data representing operational guidance, to a predetermined mail address. In this case, for example, a message such as "A shortcut button for an operation which is frequently performed will be generated the next time." may be transmitted to a personal computer or a portable terminal carried by the user. Thus, various types of notification transmitted to a user may be used. In short, any method may be employed as long as the CPU 101 notifies a user.

The CPU 101 may transmit data indicating that the accumulated time for an image processing operation exceeds the threshold, to a predetermined management apparatus. In this case, the management apparatus may summarize such information, thereby performing statistical processing for obtaining information describing which operation is one which requires time.

Another example is that the CPU 101 specifies whether or not a user is present in a predetermined area with respect to the image forming apparatus 10 on the basis of a signal which is output from the pyroelectric sensor 105. When a user is not present in the predetermined area with respect to the image forming apparatus 10, the CPU 101 may transmit data representing operational guidance, to a predetermined terminal. In addition, for example, when the pyroelectric sensor 105 fails to detect a user in a state in which, for example, a document used for scanning is left on the image forming apparatus 10, the CPU 101 may transmit a notification of this. Specifically, for example, a voice message such as "Something is left" or a beep may be output from the image forming apparatus 10. In addition, the CPU 101 may transmit a message saying that something is left, to a predetermined terminal (terminal carried by the user).

3-4. Fourth Modified Exemplary Embodiment

In the above-described exemplary embodiment, the average-accumulated-time table 41 and the history table 42 are stored in the storage 104 of the image forming apparatus 10. The average-accumulated-time table 41 and the history table 42 may be stored in a storage unit provided outside of the image forming apparatus 10. In this case, for example, the CPU 101 of the image forming apparatus 10 may refer to or update the tables via a communication network.

3-5. Fifth Modified Exemplary Embodiment

In the above-described exemplary embodiment, a user presses the start button or a shortcut button displayed on the UI unit 107, thereby inputting an instruction to cause the image forming apparatus 10 to perform an image processing operation. The way in which a user gives an instruction to perform an image processing operation is not limited to this. For example, a so-called line-of-sight input or a so-called voice input may be used to provide an instruction to perform an image processing operation. The display unit according to the exemplary embodiment of the present invention is not limited to one which is manually operated by a user. Examples of the display unit include one on which an image for providing guidance or support for a user operation is displayed when a user operates the image forming apparatus 10 (including when the user operates the image forming apparatus 10 through a line-of-sight input or a voice input).

3-6. Sixth Modified Exemplary Embodiment

In the above-described exemplary embodiment, the programs executed by the CPU 101 of the image forming apparatus 10 may be downloaded via a communication line such as the Internet. In addition, the programs may be provided by recording them in a computer-readable recording medium, such as a magnetic recording medium (e.g., a magnetic tape or a magnetic disk), an optical recording medium (e.g., an optical disk), a magneto-optical medium, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an imaging unit configured to perform imaging on an operator;
   a display unit configured to display operation information for performing image processing;
   a detection unit configured to detect viewing of the display unit by the operator on a basis of a result of the imaging performed by the imaging unit;
   a measurement unit configured to accumulatively measure a time in which the detection unit detects the viewing;
   a notification unit configured to provide a notification of guidance according to the image processing in response to the accumulatively measured time exceeding a predetermined threshold;
   a first receiving unit configured to receive identification information for identifying the operator;
   a second receiving unit configured to receive an instruction to perform an image processing operation, the instruction being input by the operator; and
   an acquiring unit configured to acquire information corresponding to the received identification information from a storage unit storing the identification information for identifying the operator and information describing the image processing operation in such a manner that both are associated with each other,
   wherein the measurement unit is configured to accumulatively measure the time in which the detection unit detects the viewing in a period from a predetermined start timing to the reception of the instruction, and
   wherein the notification unit is configured to provide a notification of guidance according to the acquired information in response to the accumulatively measured time exceeding the predetermined threshold.

2. The image processing apparatus according to claim 1, further comprising:
   a storage controller configured to store in the storage unit, in response to the accumulatively measured time exceeding the predetermined threshold, the information describing the image processing operation corresponding to the received instruction, in association with the received identification information.

3. The image processing apparatus according to claim 1, further comprising:
   a second notification unit configured to provide, in response to the acquiring unit acquiring the information, the notification of guidance according to the acquired information in at least part of the period from the start timing to the reception of the instruction.

4. The image processing apparatus according to claim 1,
   wherein the first receiving unit is configured to perform authentication of the operator on a basis of imaging data which is output from the imaging unit, and
   wherein the predetermined start timing is a timing at which the authentication succeeds.

5. The image processing apparatus according to claim 2,
   wherein the storage controller is configured to store, in response to the accumulatively measured time exceeding the predetermined threshold, the information and the identification information in association with the accumulatively measured time,
   wherein the storage unit is configured to store, in the case where the information includes a plurality of pieces of information, the plurality of pieces of information in association with the received identification information, and
   wherein the notification unit is configured to select a piece of information from the plurality of pieces of information, and provide a notification of guidance according to the selected piece of information, the selected piece of information being such that an accumulatively measured time stored so as to be associated with the selected piece of information satisfies a predetermined condition.

6. The image processing apparatus according to claim 1,
   wherein the notification unit is configured to display, on the display unit, an operation button for providing an instruction to perform an image processing operation indicated by the stored information.

7. The image processing apparatus according to claim 1, further comprising:
   a specifying unit configured to specify whether or not the operator is present in a predetermined area with respect to the image processing apparatus,
   wherein the notification unit is configured to transmit information representing the guidance to a predetermined terminal in response to the specifying unit specifying that the operator is not present in the area.

8. The image processing apparatus according to claim 1, wherein the imaging unit is configured to process photographic data of the operator.

9. The image processing apparatus according to claim 1, wherein the detection unit is configured to detect whether or not the operator is viewing the display unit on the basis of the result of the imaging performed by the imaging unit.

10. The image processing apparatus according to claim 8, wherein the photographic data of the operator comprises a face image of the operator, and
    wherein the detection unit is configured to detect whether a line of sight of the operator is directed to the display unit by using the face image of the operator.

11. A non-transitory computer readable medium storing a program configured to cause a computer to execute a process, the process comprising:
    performing imaging on an operator;
    displaying operation information for performing image processing;

detecting viewing by the operator on a basis of a result of the imaging;

accumulatively measuring a time in which the viewing is detected;

providing a notification of guidance according to the image processing in response to the accumulatively measured time exceeding a predetermined threshold;

receiving identification information for identifying the operator;

receiving an instruction to perform an image processing operation, the instruction being input by the operator; and acquiring information corresponding to the received identification information from a storage unit storing the identification information for identifying the operator and information describing the image processing operation in such a manner that both are associated with each other, wherein the accumulatively measuring the time comprises accumulatively measuring time in which the detecting detects the viewing in a period from a predetermined start timing to the reception of the instruction, and wherein the providing the notification of guidance comprises providing the notification of guidance according to the acquired information in response to the accumulatively measured time exceeding the predetermined threshold.

* * * * *